No. 879,549. PATENTED FEB. 18, 1908.
N. E. HOWARD.
GEARING.
APPLICATION FILED MAR. 4, 1907.

2 SHEETS—SHEET 1.

Witnesses
G. R. Thomas
F. G. Smith

Inventor
N. E. Howard
By Chandler Chandler
Attorneys

No. 879,549.

PATENTED FEB. 18, 1908.

N. E. HOWARD.
GEARING.
APPLICATION FILED MAR. 4, 1907.

2 SHEETS—SHEET 2.

Witnesses
G. R. Thomas
F. G. Smith

Inventor
N. E. Howard

By Chandler & Chandler
Attorneys

UNITED STATES PATENT OFFICE.

NATHAN E. HOWARD, OF STATESBORO, GEORGIA.

GEARING.

No. 879,549.  Specification of Letters Patent.  Patented Feb. 18, 1908.

Application filed March 4, 1907. Serial No. 360,383.

*To all whom it may concern:*

Be it known that I, NATHAN E. HOWARD, a citizen of the United States, residing at Statesboro, in the county of Bulloch, State of Georgia, have invented certain new and useful Improvements in Gearing; and I do hereby declare the following to be a full, clear, and exact description of the invention, such as will enable others skilled in the art to which it appertains to make and use the same.

This invention relates to saw mill feed mechanisms and has for its object to provide a mechanism for imparting a forward feed to the saw mill carriage which mechanism is operable to secure a quick return of the carriage and to stop the movement of the carriage at any desired point.

Broadly speaking the invention resides in the provision of a shaft which is driven from the saw shaft and which carries a friction disk, and in arranging in the frame in which the saw shaft is journaled, a rocking frame the ends of which are connected with eccentrics in which the ends of a shaft are journaled. This shaft carries friction gears which are designed for interchangeable contact with the friction disk upon the shaft which is driven from the saw shaft. The last named shaft which carries the two friction gears, is so engaged at its ends with the eccentrics and the eccentrics are so positioned that the shaft, owing to the rocking of the frame which is connected to the eccentrics and the consequent change in the relative position of the eccentrics, that it may assume either one of two diagonal positions with respect to the opposing face of the friction disk carried by the shaft which is driven from the saw shaft, thereby bringing one or the other of the gears into contact with the said friction disk or may be made to assume a position intermediate these two positions and parallel with the said opposing face of the disk, thereby throwing both of the gears out of contact with the first mentioned friction disk. The shaft which carries the two friction gears is geared with a shaft carrying a drum, and a cable engaged around this drum is connected at its ends to opposite ends of the saw mill carriage so that the carriage may be drawn in either direction according to the direction in which the shaft carrying the friction gear is rotated.

Figure 1:
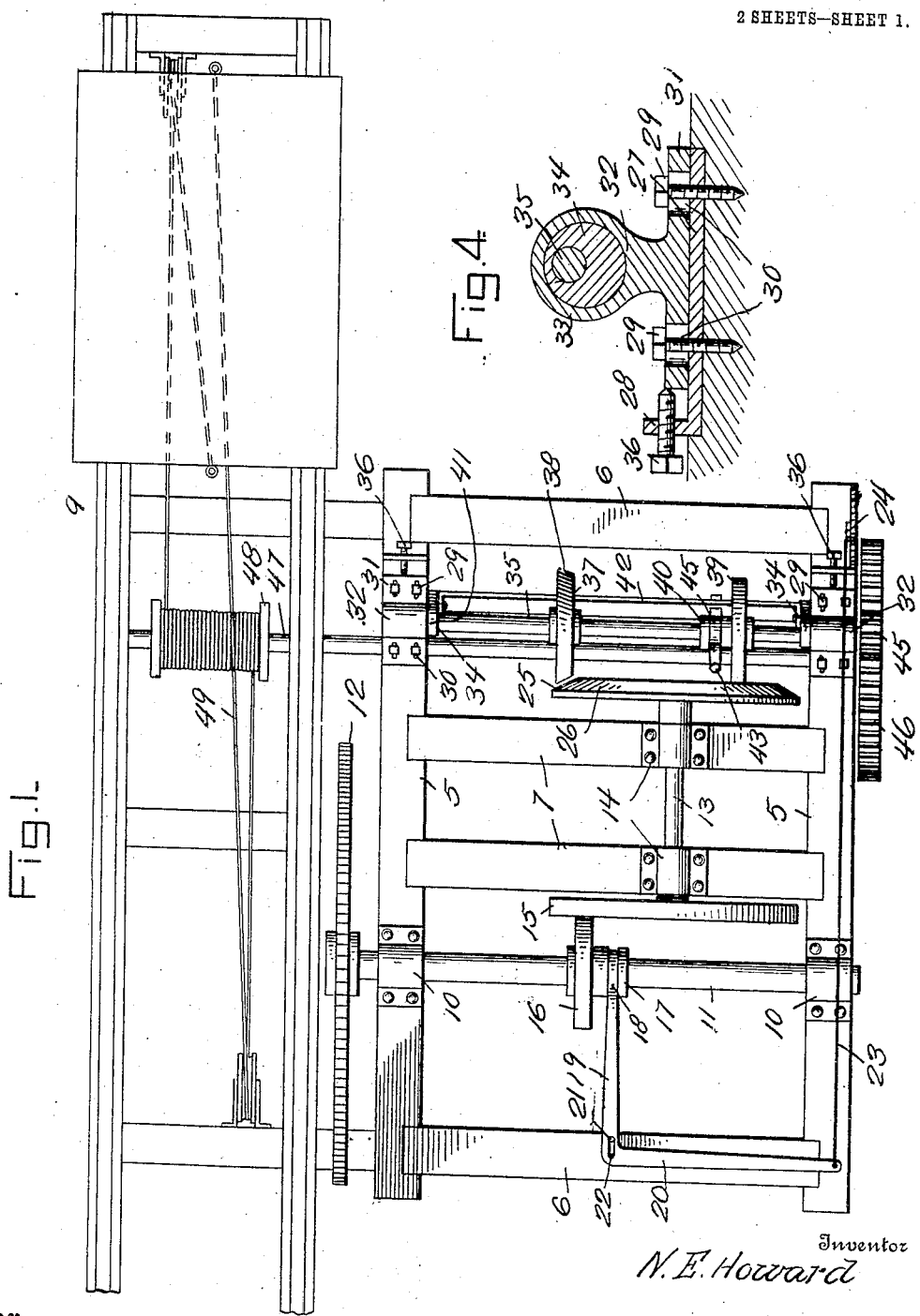
Figure 2:
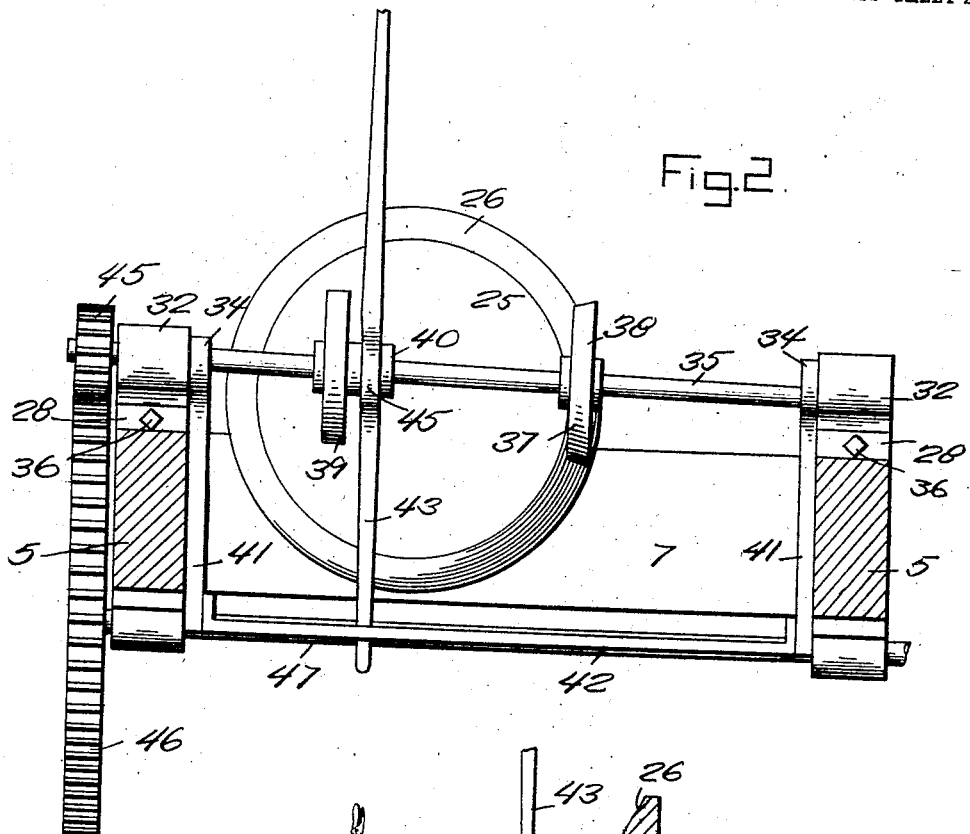
Figure 3:
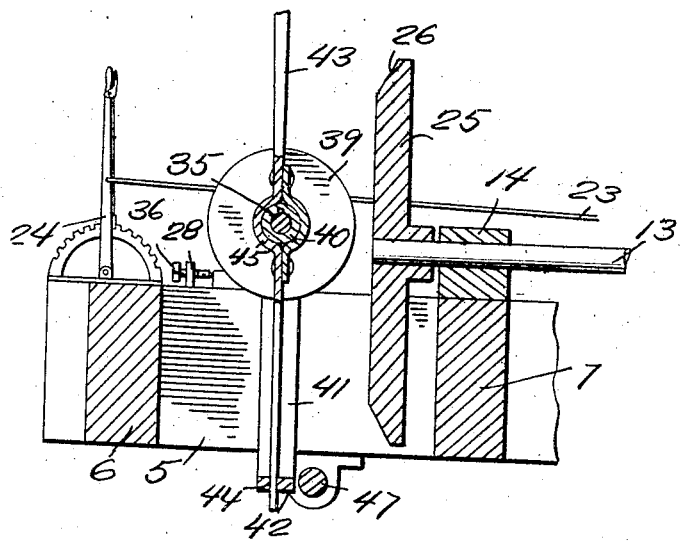

In the accompanying drawings, Figure 1 is a top plan view of the mechanism the lever being moved to shift the carriage forwardly, Fig. 2 is a detail vertical transverse sectional view through the frame taken to one side of the rocking frame showing the same in elevation, Fig. 3 is a detail vertical longitudinal view taken through a portion of the frame and through the rocking frame, and, Fig. 4 is a detail vertical sectional view through one of the shaft bearings.

Referring more specifically to the drawings the frame for the entire mechanism is shown as comprising side sills 5 which are connected by means of end cross pieces 6 and a pair of intermediate cross pieces 7.

The numeral 8 denotes a saw mill carriage in general which carriage is mounted upon the usual frame 9 and journaled in suitable bearing boxes 10 arranged upon the side sills 5 is a shaft 11 which is the saw shaft of the mechanism, the saw being indicated by the numeral 12. A shaft 13 is journaled in suitable bearing boxes 14 supported upon the cross pieces 7 and this shaft extends at right angles to the shaft 11 and is geared with the same for rotation therewith in the following manner. A friction disk 15 is carried by the shaft 13 at its end adjacent the shaft 11 and upon this shaft is splined a friction gear 16 which includes a grooved collar extension 17 in the groove in which is engaged a closely fitting yoke 18 formed at the end of one arm 19 of an angle lever 20 which lever is pivoted upon the frame of the mechanism by means of a pin 21 which projects through a slot 22 formed in the said arm 19 of the angle lever it being understood that when this lever is rocked, the pin will ride from its normal position at one end of the slot toward the other end thereof to allow for the movement of the friction gear 16 across the face of the disk 15. To the end of the other arm of the angle lever is connected one end of a connecting rod 23 and this rod is pivoted at its other end to a lever 24 which is pivoted upon the frame and is adapted to be rocked to impart to the gear 16 the movement stated. The lever 24 is held in its different positions by means of the usual segmental rack and bolt.

Arranged upon the opposite end of the shaft 13 to the disk 15 is a friction disk 25 having a plane face and a bevel edge 26 and secured upon the side sills of the frame beyond this disk are plates 27 having each an upturned end 28. Bolts 29 are engaged through slots 30 formed in the base 31 of a bearing block 32 which is seated upon each of these plates 27 and these bolts are engaged through the plates 27 and into the said side sills and serve to hold the bearing blocks 32 for sliding movement upon the plates 27. Formed integral with each of these bearing blocks is a band or collar 33 which embraces an eccentric 34 and journaled at its end in these eccentrics is a shaft 35 it being understood that the eccentrics with said shaft may be adjusted toward and from the friction gear 25 by turning set screws 36 which are engaged through the upturned ends of the plates 27 and bear against the ends of the blocks 31, to compensate for wear of the friction faces.

A friction gear 37 is carried by the shaft 35 and has a peripheral bevel face 38 which is designed for contact with the bevel face 26 of the disk 25 and a second gear 39 splined upon the shaft 35, is designed for engagement with the plane face of the friction disk 25, and includes an integral flanged sleeve portion 40. In order that these friction gears 37 and 39 may be thrown independently of each other in the contact with the friction disk 25 I secure upon each of the eccentrics an arm 41 and these arms extend downwardly and are connected by means of a cross bar 42 and a lever 43 has its lower end seated in the bearing opening 44 in the cross bar 32 and adjacent its middle the lever is provided with a collar portion 45 which is engaged with the sleeve portion 40 in such a manner that it may rock independently of the sleeve so as to swing the arms 41 to change the position of the eccentrics and bring one or the other of the friction gears into contact with the friction disk.

The eccentrics are so arranged that when the gear 39 is in engagement with the gear 25, the shaft 35 will extend in a diagonal plane with respect to the adjacent face of the gear 25 and the ends of the frame 41 are connected with the eccentric at points substantially diametrically opposite to the points of connection of the shaft 35 with the eccentric as regards their true centers. It will thus be seen that by rocking the lever 43 transversely of the shaft 35, the frame 41 will be turned upon its pivot in such a manner as to reverse the positions of the eccentrics and supposing the gear 39 to be in engagement with the gear 25, before such rocking of the lever, the shaft will be so moved by the reversal of the position of the eccentric that both gears 37 and 39 will be moved away from the gear 25 and subsequently the gear 37 will be moved into engagement with the said gear 25. This lever is also adapted to rock longitudinally of the shaft 35 to cause the gear 39 to move across the face of the gear 25 and change the speed of rotation of the shaft 35.

Secured at one end of the shaft 35 is a pinion 45 which is in mesh with a gear 46 carried by a shaft 47 and at the opposite end of the shaft 47 to the gear 46 there is arranged a drum 48 over which is engaged a cable 49 which is connected at its ends to opposite ends of the saw mill carriage.

From the foregoing it will be apparent that when the gear 39 is in contact with the gear 25, the shaft 47 will be rotated in a direction to move the saw mill carriage forwardly through the instrumentality of the cable and that when the gear 37 is brought into engagement with the gear 25, this movement of the carriage will be reversed due to the reversal of the movement of the shaft 47.

What is claimed is—

1. The combination with a drive shaft and a countershaft driven from the drive shaft, of a friction gear carried by the countershaft and having plane and beveled faces, bearings, eccentrics arranged for movement in the bearings, a driven shaft journaled at its ends in the eccentrics, friction gears carried by the said driven shaft and adapted to coöperate one with the plane face of the first named friction gear and the other with the beveled face thereof, and means for moving the eccentrics whereby one or the other of the two gears will be brought into engagement with the first named friction gear and whereby both of the gears may be moved out of such engagement.

2. The combination with a drive shaft and a countershaft driven from the drive shaft, of a friction gear carried by the countershaft, and having plane and beveled faces, bearings, eccentrics arranged for movement in the bearings, a driven shaft journaled at its ends in the eccentrics, friction gears carried by the shaft and adapted to coöperate one with the plane face of the first named friction gear and the other with the beveled face thereof, a member connected at its ends with the eccentrics, said member being adapted to be rocked, and means for rocking the member.

3. The combination with a drive shaft and a countershaft driven from the drive shaft, of a friction gear carried by the countershaft and having plane and beveled friction faces, bearings, eccentrics arranged for movement in the bearings, a driven shaft journaled at its ends in the eccentrics, friction gears carried by the driven shaft and adapted to coöperate one with the plane face of the first named friction gear and the other with the beveled face thereof, a member connected at its ends with the eccentrics, said member being adapted to be rocked, and a lever for rocking the member.

4. The combination with a drive shaft and a countershaft driven from the drive shaft, of a friction gear carried by the countershaft and having plane and beveled friction faces, bearings, eccentrics arranged for movement in the bearings, a driven shaft journaled at its ends in the eccentrics, friction gears carried by the shaft and adapted to coöperate one with the plane face of the first named friction gear and the other with the beveled face thereof, an arcuate frame pivotally mounted for rocking movement, said frame being pivotally connected at its ends with the eccentrics at points diametrically opposite to the points of connection of the shaft therewith, a lever mounted upon the frame for rocking movement longitudinally and transversely thereof, said lever being adapted when rocked longitudinally to shift one of the gears carried by the driven shaft and to rock the frame when rocked transversely so as to bring one or the other of the gears into engagement with the first named friction gear or to move both of the said gears out of such engagement.

5. The combination with a drive shaft and a countershaft driven from the drive shaft, of a friction gear carried by the countershaft and having plane and beveled faces, bearings, eccentrics arranged for movement in the bearings, a driven shaft journaled at its ends in the eccentrics, friction gears carried by the driven shaft and adapted to coöperate one with the plane face of the first named friction gear and the other with the beveled face thereof, and means for moving the eccentrics in opposition with respect to each other whereby one or the other of the two gears will be brought into engagement with the first named friction gear.

In testimony whereof, I affix my signature in presence of two witnesses.

NATHAN E. HOWARD

Witnesses:
  PHILIP F. LARNER,
  FORREST G. SMITH.